(12) United States Patent
Friend et al.

(10) Patent No.: US 9,128,183 B2
(45) Date of Patent: Sep. 8, 2015

(54) MACHINE NAVIGATION SYSTEM UTILIZING SCALE FACTOR ADJUSTMENT

(71) Applicant: Caterpillar Inc., Peoria, IL (US)

(72) Inventors: Paul Russell Friend, Morton, IL (US); Frank Arthur Willis, Mapleton, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/688,534

(22) Filed: Nov. 29, 2012

(65) Prior Publication Data

US 2014/0145876 A1    May 29, 2014

(51) Int. Cl.
G01S 19/52    (2010.01)
G01C 22/00    (2006.01)

(52) U.S. Cl.
CPC .................. G01S 19/52 (2013.01); G01C 22/00 (2013.01)

(58) Field of Classification Search
CPC ........... G01S 5/02; G01S 19/52; G06F 15/50; G01C 21/26
USPC .................................................. 701/469, 213
See application file for complete search history.

(56) References Cited

U.S. PATENT DOCUMENTS

| | | | |
|---|---|---|---|
| 5,416,712 A | 5/1995 | Geier et al. | |
| 5,525,998 A | 6/1996 | Geier | |
| 5,898,390 A | 4/1999 | Oshizawa et al. | |
| 6,024,655 A | 2/2000 | Coffee | |
| 6,230,100 B1 | 5/2001 | Geier | |
| 6,360,165 B1 | 3/2002 | Chowdhary | |
| 6,446,005 B1* | 9/2002 | Bingeman et al. | 701/470 |
| 6,856,903 B2 | 2/2005 | Ishigami et al. | |
| 2006/0195262 A1* | 8/2006 | Draganov | 701/214 |
| 2010/0076681 A1* | 3/2010 | Colley | 701/213 |
| 2011/0184644 A1 | 7/2011 | McBurney | |

FOREIGN PATENT DOCUMENTS

EP    0738877 A2    4/1996

* cited by examiner

*Primary Examiner* — Calvin Cheung
*Assistant Examiner* — Martin Weeks
(74) *Attorney, Agent, or Firm* — Finnegan, Henderson, Farabow, Garrett & Dunner, LLP

(57) ABSTRACT

A machine navigation system and method for estimating velocity of a machine is disclosed. The method may include receiving, from an odometer, a first signal indicative of a distance traveled by the machine and calculating a scale factor to compensate for an error associated with the first signal. The method may further include determining whether a second signal indicative of a location of the machine is received by the machine and selectively adjusting the scale factor using machine parameters to generate an adjusted scale factor, where selectively adjusting may be performed based on whether the second signal is received by the machine. The method may further include estimating the velocity of the machine based on the first signal and the adjusted scale factor.

20 Claims, 3 Drawing Sheets

MACHINE NAVIGATION SYSTEM UTILIZING SCALE FACTOR ADJUSTMENT

TECHNICAL FIELD

The present disclosure relates generally to a machine navigation system and, more particularly, to a machine navigation system utilizing scale factor adjustment.

BACKGROUND

Machines such as, for example, dozers, motor graders, wheel loaders, wheel tractor scrapers, and other types of heavy equipment are used to perform a variety of tasks. Autonomously and semi-autonomously controlled machines are capable of operating with little or no human input by relying on information received from various machine systems. For example, based on machine movement input, terrain input, and/or machine operational input, a machine can be controlled to remotely and/or automatically complete a programmed task. By receiving appropriate feedback from each of the different machine systems during performance of the task, continuous adjustments to machine operation can be made that help to ensure precision and safety in completion of the task. In order to do so, however, the information provided by the different machine systems should be accurate and reliable. The velocity and distance traveled by the machine are parameters whose accuracy may be important for control and positioning of the machine.

Conventional machines typically utilize a navigation or positioning system to determine various operating parameters such as velocity, pitch rate, yaw rate, roll rate, etc. for the machine. Some conventional machines utilize a Distance Measurement Indicator (DMI) or odometer measurement to determine the velocity and distance traveled by the machine. For example, the machine controller may receive a measurement of the number of rotations of a wheel of the machine from the odometer and may calculate a distance traveled by the machine by using the number of rotations and a predetermined size of the wheel. The distance traveled may be utilized to determine the velocity of the machine. However, the distance calculated using the above method may have an error associated with it because the wheel size may change due to heat, tire pressure, road conditions, etc and the predetermined wheel size used to calculate the distance may not capture this wheel size change. Further, the rotations of the wheel may not accurately reflect the distance traveled if the wheels are subject to slipping. To compensate for such errors, some conventional machines utilize a scale factor for the distance calculation. In order to estimate the scale factor, an independent measurement for the distance traveled may be obtained by utilizing a Global Navigation Satellite System (GNSS). The distance calculated using GNSS data may be compared with the distance calculated using the odometer measurements and the scale factor may accordingly be adjusted to compensate for changes in wheel size due to the factors mentioned above.

An exemplary system that may be used to compensate for odometer measurement errors is disclosed in U.S. Pat. No. 6,360,165 ("the '165 patent") to Chowdhary that issued on Mar. 19, 2002. The system of the '165 patent is capable of calculating the distance traveled by a vehicle. Specifically, the system of the '165 patent multiplies an odometer signal proportionate to the number of rotations of a drive train member (such as a wheel) with an odometer conversion parameter to convert the odometer signal into an estimated distance ($D_r$) traveled. When a Global Positing System (GPS) signal is available, a distance ($D_g$) traveled by the vehicle is calculated using the GPS signal and the odometer conversion parameter is calibrated to bring $D_r$ into closer proximity to $D_g$. However, if the GPS signal is not reliable or the slip of the vehicle is higher than a certain threshold, the odometer conversion parameter is not updated to avoid introduction of slip related errors into the odometer conversion parameter.

Although the system of the '165 patent may be useful in determining the distance traveled by a machine, the system may not provide accurate estimates for distance traveled and velocity of the machine while dead-reckoning (i.e., during periods of time when GPS signals are unavailable) because the odometer conversion parameter is not updated during loss of GPS signals. For example, the system of the '165 patent may not compensate for any changes in the wheel size due to road conditions or weather conditions when the GPS signal is lost. In another scenario where the machine is loading or dumping materials carried by it while operating in an area where GPS signals are unavailable, a change in the wheel size is likely to occur but the system of the '165 patent may not compensate for this wheel size change because it does not update the odometer conversion parameter when GPS signals are unavailable.

The navigation system of the present disclosure is directed toward solving one or more of the problems set forth above and/or other problems of the prior art.

SUMMARY

In one aspect, the present disclosure is directed to a system for estimating velocity of a machine. The system may include an odometer configured to generate a first signal indicative of a distance traveled by the machine, and a locating device configured to receive a second signal indicative of a location of the machine. The system may further include a sensor configured to provide parametric values associated with performance of the machine, and a controller in communication with the odometer, the locating device, and the sensor. The controller may be configured to calculate a scale factor to compensate for an error associated with the first signal and determine whether the second signal is received by the locating device. The controller may be further configured to selectively adjust the scale factor using the parametric values to generate an adjusted scale factor where selectively adjusting may be performed based on whether the second signal is received by the locating device. The controller may be further configured to estimate the velocity of the machine based on the first signal and the adjusted scale factor.

In another aspect, the present disclosure is directed to a method of estimating velocity of a machine. The method may include receiving, from an odometer, a first signal indicative of a distance traveled by the machine and calculating a scale factor to compensate for an error associated with the first signal. The method may further include determining whether a second signal indicative of a location of the machine is received by the machine and selectively adjusting the scale factor using machine parameters to generate an adjusted scale factor, where selectively adjusting may be performed based on whether the second signal is received by the machine. The method may further include estimating the velocity of the machine based on the first signal and the adjusted scale factor.

In yet another aspect, the present disclosure is directed to a non-transitory computer-readable storage device storing instruction for enabling a process to execute a method of estimating velocity of a machine. The method may include receiving, from an odometer, a first signal indicative of a distance traveled by the machine and calculating a scale factor to compensate for an error associated with the first signal.

The method may further include determining whether a second signal indicative of a location of the machine is received by the machine and selectively adjusting the scale factor using machine parameters to generate an adjusted scale factor, where selectively adjusting may be performed based on whether the second signal is received by the machine. The method may further include estimating the velocity of the machine based on the first signal and the adjusted scale factor.

DETAILED DESCRIPTION

Figure 1:
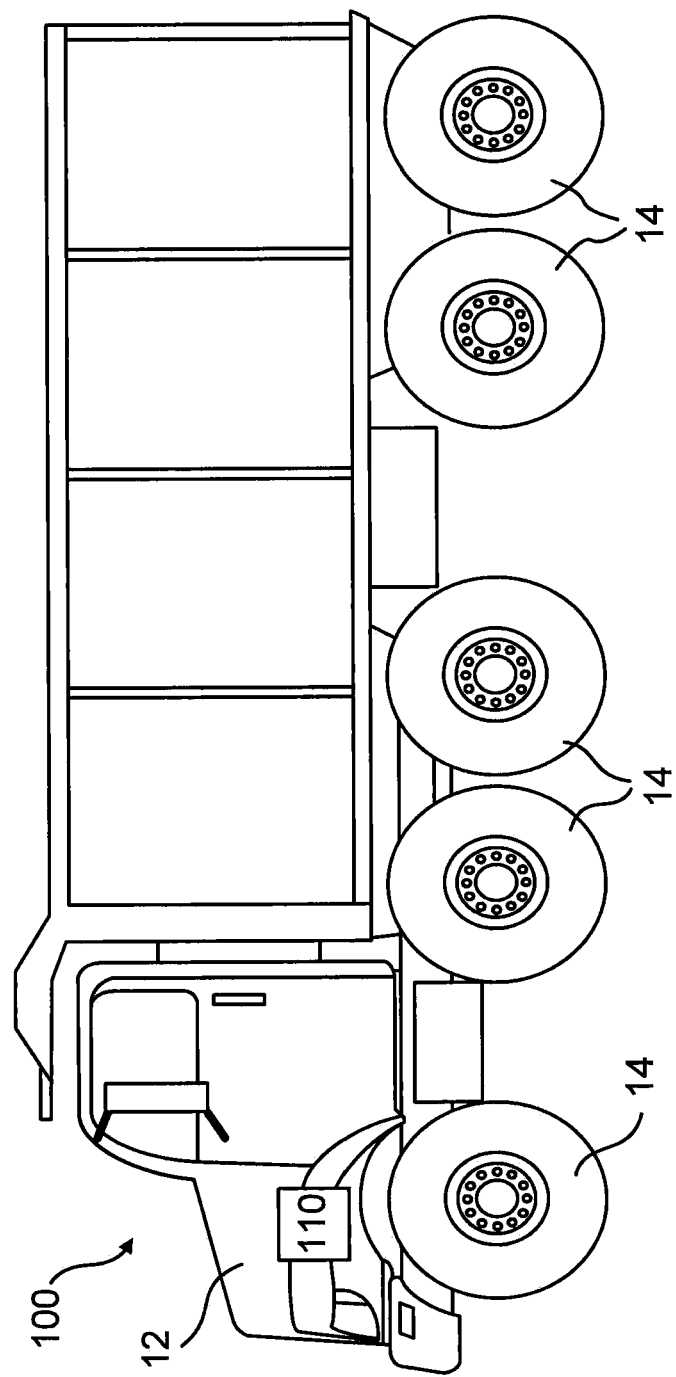
FIG. 1 is a pictorial illustration of an exemplary disclosed machine.

FIG. 1 illustrates a machine 100 having an exemplary disclosed navigation system 110. The machine 100 may be configured to perform some type of operation associated with an industry such as mining, construction, farming, transportation, power generation, or any other industry known in the art. For example, machine 100 may be an earth moving machine such as a haul truck, a dozer, a loader, a backhoe, an excavator, a motor grader, a wheel tractor scraper or any other earth moving machine. Machine 100 may generally include a frame 12 that at least partially defines or supports an operator station, one or more engines mounted to the frame, a plurality of traction devices 14 driven by the engine to propel machine 100. The traction devices 14, in the disclosed exemplary embodiments, are wheels located at opposing sides of machine 100. Each traction device 14 may be independently driven to turn machine 100 or simultaneously and dependently driven to propel machine 100 in a straight direction. It is contemplated that one or all of traction devices 14 may be replaced with another type of traction device, if desired, such as belts or tracks.

Figure 2:
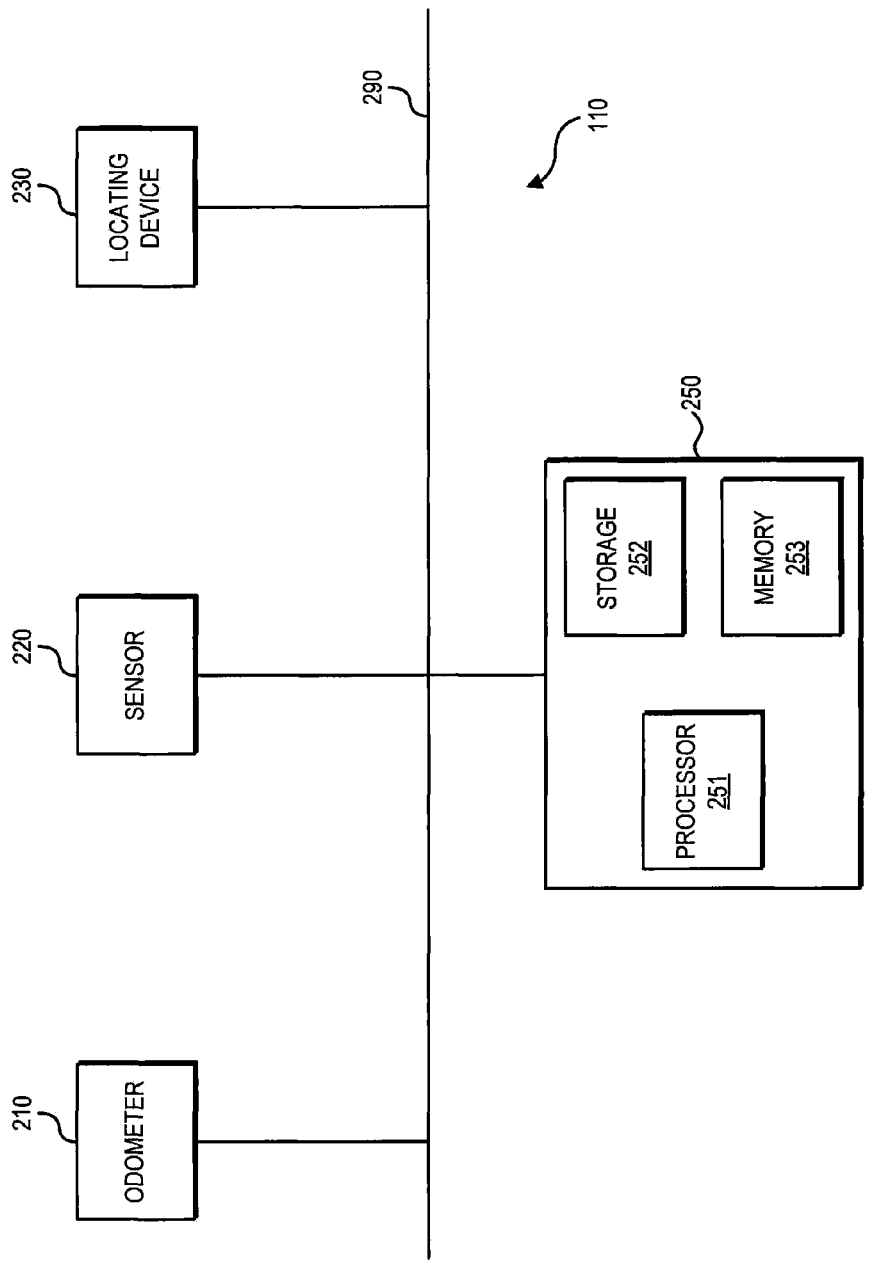
FIG. 2 is a diagrammatic illustration of an exemplary disclosed navigation system that may be used in conjunction with the machine of FIG. 1.

FIG. 2 illustrates an exemplary embodiment of the navigation system 110. The navigation system 110 may include an odometer 210, a sensor 220, a locating device 230, and a controller 250. The above sensors and the controller 250 may be connected to each other via a bus 290. While a bus architecture is shown in FIG. 2, any suitable architecture may be used, including any combination of wired and/or wireless networks. Additionally, such networks may be integrated into any local area network, wide area network, and/or the Internet.

The odometer 210 may provide a signal indicative of a distance traveled by the machine. The odometer 210 may provide as the signal, a measurement of number of rotations of the traction device 14 (such as a wheel 14). The odometer 210 may also provide, as the signal indicative of a distance traveled by the machine, a measurement of number of rotations of a member of the machine 100's drive train. For example, the odometer 210 may provide a measurement of number of rotations of an axle of the machine 100.

The sensor 220 may include any device capable of providing parametric values or machine parameters associated with performance of the machine 100. For example, the sensor 220 may include a payload sensor that provides a signal indicative of a payload of the machine 100. The sensor 220 may further include a slip detector that provides a signal indicative of a slip of the machine 100. The sensor 220 may further include devices capable of providing signals indicative of a slope of the ground on which the machine 100 is operating, an outside temperature, tire pressure if the traction device 14 is a wheel, etc. It will be understood that the sensor 220 may have one or more of the above-mentioned devices that provide the different parametric values or machine parameters such as payload, temperature, tire pressure, slip, slope, etc.

The locating device 230 may include any device capable of providing a signal that indicates the machine's location. For example, the locating device 230 could embody, a global satellite system device (e.g., a GPS or GNSS device), a laser range finding device, or any other known locating device that receives or determines positional information associated with machine 100 and can provide an independent measurement of the machine's position. The locating device 230 may be configured to convey a signal indicative of the received or determined positional information to one or more of interface devices for display of machine location, if desired. The signal may also be directed to a controller 250 for further processing. In the exemplary embodiments discussed herein, the locating device 230 receives a GPS signal as the location signal indicative of the location of the machine 100 and provides the received location signal to the controller 250 for further processing. However, it will be understood by one of ordinary skill in the art that the disclosed exemplary embodiments could be modified to utilize other indicators of the location of the machine 100, if desired.

Controller 250 may include processor 251, storage 252, and memory 253, included together in a single device and/or provided separately. Processor 251 may include one or more known processing devices, such as a microprocessor from the Pentium™ or Xeon™ family manufactured by Intel™, the Turion™ family manufactured by AMD™, any of various processors manufactured by Sun Microsystems, or any other type of processor. Memory 253 may include one or more storage devices configured to store information used by controller 250 to perform certain functions related to disclosed embodiments. Storage 252 may include a volatile or non-volatile, magnetic, semiconductor, tape, optical, removable, nonremovable, or other type of storage device or computer-readable medium. Storage 252 may store programs and/or other information, such as information related to processing data received from one or more sensors, as discussed in greater detail below.

In one embodiment, memory 253 may include one or more velocity estimation programs or subprograms loaded from storage 252 or elsewhere that, when executed by processor 251, perform various procedures, operations, or processes consistent with the disclosed embodiments. For example, memory 253 may include one or more programs that enable controller 250 to, among other things, collect data from the odometer 210, the sensor 220, and the locating device 230, process the data according to disclosed embodiments such as those embodiments discussed with regard to FIG. 3, and estimate the velocity of the machine 100 based on the processed data.

In certain exemplary embodiments, the velocity estimation programs may enable the controller 250 (more particularly enable the processor 251) to process the received signals using a Kalman filter to estimate the velocity of the machine 100. A Kalman filter is a mathematical method that may be used to determine accurate values of measurements observed over time, such as measurements taken in a time series. The Kalman filter's general operation involves two phases, a propagation or "predict" phase and a measurement or "update" phase. In the predict phase, the value estimate from the previous timestep in the time series is used to generate an a priori value estimate. In the update phase, the a priori estimate calculated in the predict phase is combined with an estimate of the accuracy of the a priori estimate (e.g., the variance or the uncertainty), and a current measurement value to produce a refined a posteriori estimate.

In certain exemplary embodiments, the controller 250 may be enabled to implement a "predict" and "update" phase of a Kalman filter. In the "predict" phase, the controller 250 may receive, from the odometer 210, a signal indicative of the distance traveled by the machine 100. For example, the controller 250 may receive, from the odometer 210, a measurement of number of rotations of a traction device 14 (for example, wheel 14). The controller 250 may also receive a scale factor, which when multiplied by the number of rotations of traction device 14, provides the distance traveled by the machine 100 in a given time period. The scale factor received by the controller 250 may be calculated in a previous "update" phase of the Kalman filter implemented by the controller 250.

The controller 250 may calculate, during the "predict" phase, the distance traveled by the machine 100 by multiplying the received scale factor with the number of rotations of traction device 14. During the "predict" phase, the controller 250 may also estimate a velocity of the machine 100 by dividing the calculated distance by a time period corresponding to the calculated distance. In the "predict" phase, the controller 250 may also calculate an estimated uncertainty for the scale factor. Exemplarily, an uncertainty measure from an error covariance matrix of the Kalman filter may be utilized as the estimated uncertainty for the scale factor.

Having completed the "predict" phase, the controller 250 may execute the "update" phase of the Kalman filter. In the "update" phase, the controller 250 may utilize an independent measurement of the distance traveled or the velocity of the machine 100 to adjust the scale factor. Exemplarily, the controller 250 may utilize the location signals (for example, GPS signals) received from the locating device 230 to calculate a distance traveled by the machine 100. The controller 250 may then utilize the calculated distance to calculate a velocity of the machine 100. The controller 250 may next compare the distance/velocity from the "predict" phase and the distance/velocity from the "update" phase and adjust the scale factor to bring the "predict" phase distance/velocity closer to the "update" phase distance/velocity. The adjusted scale factor may be utilized by the controller 250 in the next iteration of the "predict" phase. In the "update" phase, the controller 250 may also calculate an estimated uncertainty for the scale factor. Exemplarily, an uncertainty measure from an error covariance matrix of the Kalman filter may be utilized as the estimated uncertainty for the scale factor.

Under certain conditions, the controller 250 may not execute the "update" phase of the Kalman filter after the "predict" phase. For example, if a location signal is not received by the locating device 230, the controller 250 may not execute the "update" phase of the Kalman filter because an independent measurement of the distance traveled or velocity of the machine 100 is not available. Exemplarily, the controller 250 may determine that a location signal is not received by the location device 230 if no location signal is received by the locating device 230 or an unreliable (for example, very weak) location signal is received by the locating device 230. Such a situation may occur, for example, when the machine 100 is operating in an area where GPS signals are not available or only very weak GPS signals are available.

In such conditions, where the controller 250 determines that a location signal is not received by the locating device 230 or that an unreliable location signal is received by the locating device 230, the controller 250 may utilize machine parameters or parametric values from the sensor 220 to adjust or update the scale factor used in the "predict" phase. For example, the controller 250 may receive one or more machine parameters or parametric values such as payload, slip, slope, temperature, and tire pressure from the sensor 220. The controller 250 may also retrieve corresponding lookup tables from storage 252 or memory 253 for the received machine parameters. For example, the memory 253 or storage 252 may store a lookup table for each of payload, slip, slope, temperature, and tire pressure, and the controller 250 may retrieve one or more of these lookup tables based on the machine parameters received from the sensor 220. The lookup tables may specify a measure of adjustment for the scale factor and scale factor uncertainty for a value of the received machine parameter. For example, a lookup table for slip may specify that if the slip increases by a certain amount, the scale factor and the scale factor uncertainty should be adjusted by a certain amount. In another example, a lookup table for slip may specify particular values or ranges for the scale factor and scale factor uncertainty corresponding to specific values or ranges for the slip of the machine 100. Similar lookup tables may be stored in the storage 252 or memory 253 for the other machine parameters such as payload, outside temperature, tire pressure etc.

The controller 250 may utilize the above lookup tables to adjust the current scale factor and scale factor uncertainty to generate an adjusted scale factor. In an exemplary embodiment, the controller 250 may add the different scale factor changes for the different machine parameters to adjust the scale factor. The adjusted scale factor may be utilized by the controller 250 in the next cycle or iteration of the "predict" phase to calculate the distance traveled and velocity of the machine 100.

Figure 3:
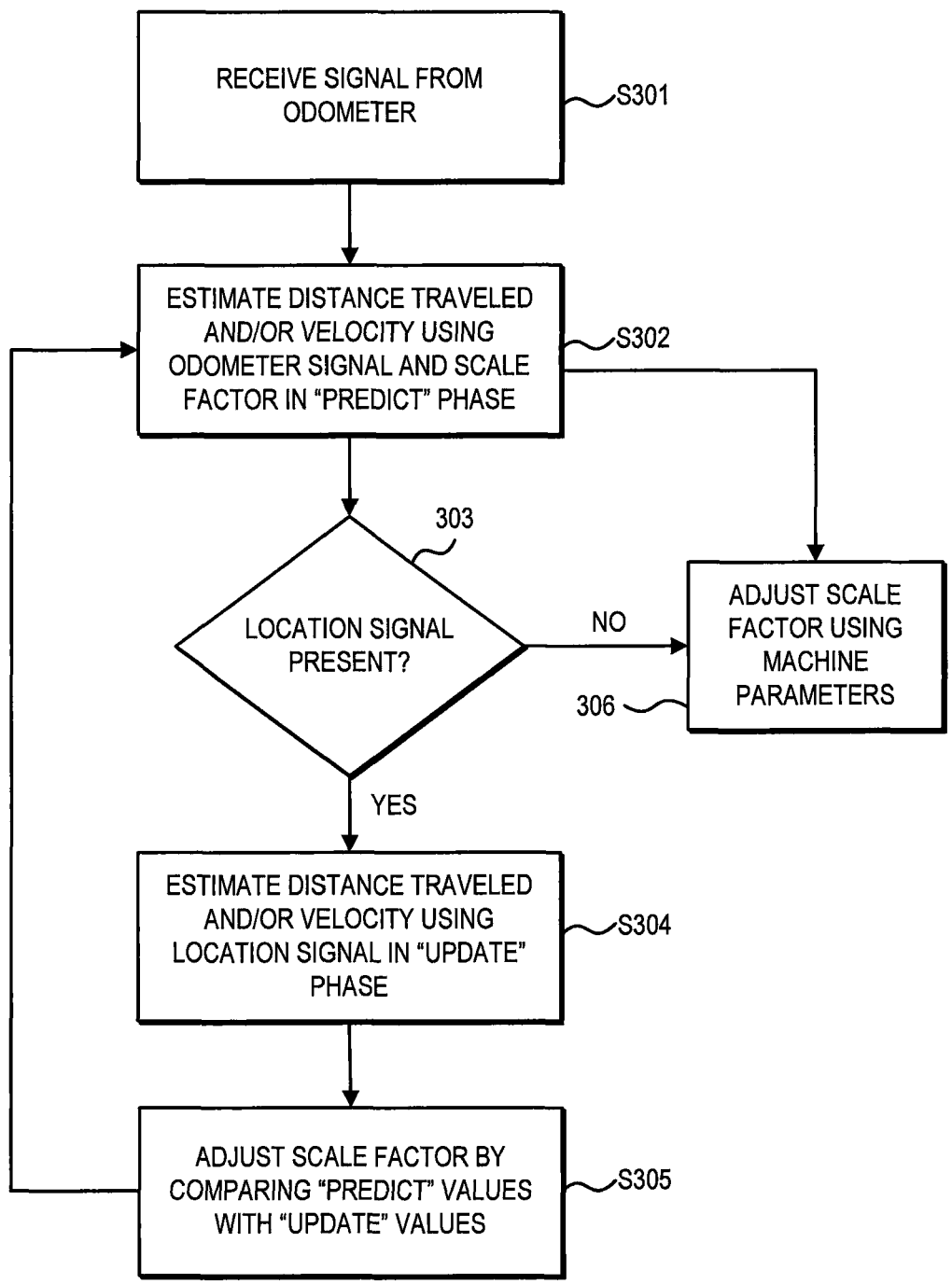
FIG. 3 is a flowchart depicting an exemplary disclosed method performed by the navigation system of FIG. 2.

FIG. 3 is an exemplary process implemented by the controller 250 to estimate the velocity of the machine 100. A detailed description of FIG. 3 is provided in the next section.

Industrial Applicability

The disclosed navigation system 110 may be applicable to any machine where accurate detection of the machine's velocity and/or distance traveled is desired. The disclosed navigation system may provide for improved estimation of the machine's velocity and/or distance traveled by utilizing machine parameters to adjust the scale factor when the machine is operating under conditions where a location signal is unavailable. Operation of the navigation system 110 will now be described in connection with the flowchart of FIG. 3.

In step 301, the controller 250 may receive, from the odometer 210, a signal indicative of the distance traveled by the machine 100. For example, the controller 250 may receive, from the odometer 210, a measurement of number of rotations of a traction device 14 (for example, wheel 14).

In step 302, the controller 250 may calculate or "predict" the distance traveled and/or velocity of the machine 100 by utilizing a scale factor and the signal received from the odometer 210. For example, the controller 250 may multiply the scale factor the with the number of rotations of traction device 14 indicated by the signal received from the odometer 210. Further, the controller 250 may also estimate a velocity of the machine 100 by dividing the calculated distance by a time period corresponding to the calculated distance. Also, the controller 250 may calculate an estimated uncertainty for the scale factor. Exemplarily, an uncertainty measure from an error covariance matrix of the Kalman filter may be utilized as the estimated uncertainty for the scale factor. It will be noted that steps 301 and 302 discussed above may correspond to the "predict" phase of the Kalman filter.

In step 303, the controller 250 may determine whether a location signal is received by the locating device 230. Exemplarily, the controller 250 may determine that a location signal is not received by the location device 230 if no location signal is received by the locating device 230 or an unreliable (for example, very weak) location signal is received by the locating device 230. Such a situation may occur, for example, when the machine 100 is operating in an area where GPS signals are not available or only very weak GPS signals are available.

If the controller 250 determines in step 303 that a reliable location signal (a strong enough location signal) is received by the locating device 230, the controller 250 may proceed to executing the "update" phase of the Kalman filter in step 304. Exemplarily, the controller 250 may utilize the location signals (for example, GPS signals) received from the locating device 230 to calculate an updated distance traveled by the machine 100. The controller 250 may then utilize the updated distance to calculate an updated velocity of the machine 100.

Having calculated the distance and/or velocity in step 304, the controller 250 may adjust the scale factor in step 305. For example, the controller 250 may compare the distance/velocity from the "predict" phase and the distance/velocity from the "update" phase and adjust the scale factor to bring the "predict" phase distance/velocity closer to the "update" phase distance/velocity. The adjusted scale factor may be utilized by the controller 250 in the next iteration of the "predict" phase. In step 305, the controller 250 may also calculate an estimated uncertainty for the scale factor. Exemplarily, an uncertainty measure from an error covariance matrix of the Kalman filter may be utilized as the estimated uncertainty for the scale factor.

If the controller 250 determines in step 303 that a location signal is not received by the locating device 230 or that an unreliable locating signal is received by the locating device 230, the controller 250 may proceed to step 306. In step 306, the controller 250 may utilize machine parameters or parametric values from the sensor 220 to adjust or update the scale factor previously used in the "predict" phase. For example, the controller 250 may receive one or more machine parameters or parametric values such as payload, slip, slope, temperature, and tire pressure from the sensor 220. The controller 250 may also retrieve corresponding lookup tables from storage 252 or memory 253 for the received machine parameters, as discussed previously. The controller 250 may utilize the lookup tables to adjust the current scale factor and scale factor uncertainty to generate an adjusted scale factor. The adjusted scale factor may be utilized by the controller 250 in the next cycle or iteration of the "predict" phase to calculate the distance traveled and velocity of the machine 100. The process may continue to repeat in this manner until receiving instructions to stop or until new data ceases to be collected from the machine 100.

The disclosed exemplary embodiments may allow for accurate estimation of the distance traveled and/or velocity of the machine 100. For example, by adjusting the scale factor by using machine parameters when the location signals are not available, an accurate estimation of the velocity of the machine 100 may be possible.

It will be apparent to those skilled in the art that various modifications and variations can be made to the disclosed navigation system. Other embodiments will be apparent to those skilled in the art from consideration of the specification and practice of the disclosed navigation system. It is intended that the specification and examples be considered as exemplary only, with a true scope being indicated by the following claims and their equivalents.

What is claimed is:

1. A method of controlling a machine, comprising:
receiving, from an odometer, a first signal indicative of a distance traveled by the machine;
calculating a scale factor to compensate for an error associated with the first signal;
determining that a second signal indicative of a location of the machine is not received by the machine;
responsive to the determination that the second signal is not received by the machine, selectively adjusting the scale factor using machine parameters to generate an adjusted scale factor;
estimating, using a processor, the velocity of the machine based on the first signal and the adjusted scale factor; and
controlling the machine using the estimated velocity of the machine.

2. The method of claim 1, wherein the second signal is a global positioning system signal.

3. The method of claim 1, wherein the first signal includes an indication of a number of rotations of a wheel of the machine in a predetermined period.

4. The method of claim 1, wherein:
the machine parameters includes at least one of a payload of the machine, a tire pressure of the machine, a slip of the machine, a slope of the machine, and an outside temperature.

5. The method of claim 4, wherein generating the adjusted scale factor further includes determining an adjustment for the scale factor based on a lookup table for the machine parameters.

6. The method of claim 1, wherein selectively adjusting the scale factor includes:
determining a first distance traveled by the machine using the scale factor and the first signal;
determining a second distance traveled by the machine using the second signal when the second signal is received by the machine; and
generating the adjusted scale factor based on a difference between the first distance and the second distance.

7. The method of claim 6, wherein:
the first distance and the second distance are calculated using a Kalman filter;
the first distance is calculated in a propagation stage of the Kalman filter; and
the second distance is calculated in a measurement update stage of the Kalman filter.

8. A system for controlling a machine, comprising:
an odometer configured to generate a first signal indicative of a distance traveled by the machine;
a locating device that includes a processor configured to receive a second signal indicative of a location of the machine;
a sensor configured to provide parametric values associated with performance of the machine; and
a controller in communication with the odometer, the locating device, and the sensor, the controller configured to:
calculate a scale factor to compensate for an error associated with the first signal;
determine that the second signal is not received by the locating device;

responsive to the determination that the second signal is not received by the locating device, selectively adjust the scale factor using the parametric values to generate an adjusted scale factor;
estimate the velocity of the machine based on the first signal and the adjusted scale factor; and
controlling the machine using the estimated velocity of the machine.

9. The system of claim 8, wherein the second signal is a global positioning system signal.

10. The system of claim 8, wherein the first signal includes an indication of a number of rotations of a wheel of the machine in a predetermined period.

11. The system of claim 8, wherein:
the parametric values include at least one of a payload of the machine, a tire pressure of the machine, a slip of the machine, a slope of the machine, and an outside temperature.

12. The system of claim 11, wherein the controller is configured to adjust the scale factor by determining an adjustment for the scale factor based on a lookup table for the parametric values.

13. The system of claim 8, wherein the controller is configured to selectively adjust the scale factor by:
determining a first distance traveled by the machine using the scale factor and the first signal;
determining a second distance traveled by the machine using the second signal when the second signal is received by the locating device; and
adjusting the scale factor based on a difference between the first distance and the second distance.

14. The system of claim 13, wherein the controller is further configured to:
determine the first distance and the second distance using a Kalman filter;
calculate the first distance in a propagation stage of the Kalman filter; and
calculate the second distance in a measurement update stage of the Kalman filter.

15. A non-transitory computer-readable storage medium storing instructions for enabling a processor to execute a method of controlling a machine, the method comprising:
receiving, from an odometer, a first signal indicative of a distance traveled by the machine;
calculating a scale factor to compensate for an error associated with the first signal;
determining that a second signal indicative of a location of the machine is received by the machine;
responsive to the determination that the second signal is not received by the machine, selectively adjusting the scale factor using machine parameters to generate an adjusted scale factor;
estimating the velocity of the machine based on the first signal and the adjusted scale factor; and
controlling the machine using the estimated velocity of the machine.

16. The non-transitory computer-readable storage medium of claim 15, wherein the second signal is a global positioning system signal.

17. The non-transitory computer-readable storage medium of claim 15, wherein the first signal includes an indication of a number of rotations of a wheel of the machine in a predetermined period.

18. The non-transitory computer-readable storage medium of claim 15, wherein:
the machine parameters includes at least one of a payload of the machine, a tire pressure of the machine, a slip of the machine, a slope of the machine, and an outside temperature.

19. The non-transitory computer-readable storage medium of claim 18, wherein generating the adjusted scale factor further includes determining an adjustment for the scale factor based on a lookup table for the machine parameters.

20. The non-transitory computer-readable storage medium of claim 15, wherein selectively adjusting the scale factor includes:
determining a first distance traveled by the machine using the scale factor and the first signal;
determining a second distance traveled by the machine using the second signal when the second signal is received by the machine; and
generating the adjusted scale factor based on a difference between the first distance and the second distance.

* * * * *